US00RE40766E

(19) United States
(12) Reissued Patent
Dreyer

(10) Patent Number: US RE40,766 E
(45) Date of Reissued Patent: Jun. 23, 2009

(54) CONVEYER IDLER

(75) Inventor: Tertius F. Dreyer, Boksburg (ZA)

(73) Assignee: Rollerbrake (Proprietary) Limited, Heidelberg (ZA)

(21) Appl. No.: 10/606,783

(22) Filed: Jun. 27, 2003

Related U.S. Patent Documents

Reissue of:
(64) Patent No.: 6,527,097
Issued: Mar. 4, 2003
Appl. No.: 09/999,181
Filed: Dec. 3, 2001

U.S. Applications:
(63) Continuation-in-part of application No. PCT/IB2000/01571, filed on Oct. 31, 2000.

(51) Int. Cl.
*B65G 13/00* (2006.01)

(52) U.S. Cl. ..... 193/35 A; 193/37; 193/35 R
(58) Field of Classification Search ..... 193/35 A, 193/37, 35 R; 198/534, 781.01, 781.02, 781.03, 198/781.04, 577; 74/577 M
See application file for complete search history.

(56) References Cited

U.S. PATENT DOCUMENTS

| | | | | |
|---|---|---|---|---|
| 116,413 | A | | 6/1871 | Close |
| 836,097 | A | | 11/1906 | Dann |
| 842,841 | A | | 1/1907 | Starr |
| 897,846 | A | | 9/1908 | Olds |
| 1,273,952 | A | | 7/1918 | Tibbetts |
| 1,362,011 | A | | 12/1920 | Kirby |
| 1,437,718 | A | | 12/1922 | Burns |
| 2,060,376 | A | | 11/1936 | Jex |
| 2,085,271 | A | | 6/1937 | Pfluger |
| 2,769,515 | A | | 11/1956 | Thomas et al. |
| 3,012,645 | A | | 12/1961 | Gensheimer |
| 3,209,880 | A | | 10/1965 | Dietker |
| 3,312,320 | A | | 4/1967 | Froio |
| 3,503,490 | A | | 1/1968 | Heyne |
| 3,606,938 | A | | 1/1968 | Heyne |
| 3,685,621 | A | | 8/1972 | Gulick et al. |
| 3,713,521 | A | | 1/1973 | Moritake |
| 3,899,063 | A | * | 8/1975 | Pollard ..... 193/35 A |
| 3,918,561 | A | * | 11/1975 | Isacsson ..... 193/35 A |
| 4,056,953 | A | * | 11/1977 | Furlette et al. ..... 464/34 |
| 4,266,659 | A | * | 5/1981 | Meyer et al. ..... 198/781.03 |
| 4,314,631 | A | * | 2/1982 | Hagerman et al. ..... 198/832.3 |
| 4,548,316 | A | | 10/1985 | Maurer |
| 5,147,020 | A | | 9/1992 | Scherman et al. |
| 5,253,856 | A | | 10/1993 | Fuchi et al. |
| 6,131,717 | A | | 10/2000 | Owen |
| 6,336,542 | B1 | * | 1/2002 | Mintonye, II ..... 193/37 |
| 6,766,900 | B2 | * | 7/2004 | Kanaris ..... 198/835 |
| 6,772,874 | B2 | * | 8/2004 | Yamashita et al. ..... 198/781.03 |

FOREIGN PATENT DOCUMENTS

| | | |
|---|---|---|
| DE | 864 978 C | 1/1953 |
| DE | 32 45 347 A | 5/1983 |

* cited by examiner

*Primary Examiner*—Douglas A Hess
(74) *Attorney, Agent, or Firm*—Nixon & Vanderhye P.C.

(57) ABSTRACT

A conveyor idler includes a sleeve having an outer surface and an inner surface, a shaft about which the sleeve can rotate in a forward direction, a locking mechanism for preventing the sleeve from rotating in a reverse direction, but which locking mechanism permits rotation of the sleeve in the forward direction, the locking mechanism being located within the sleeve and having a shaft member fixed to the shaft, with at least one locking member which can move between an unlocked position in which the sleeve can rotate in the forward direction and a locked position in which the locking member locks the sleeve to the shaft member to prevent rotation of the sleeve in the reverse direction.

18 Claims, 10 Drawing Sheets

CONVEYER IDLER

Matter enclosed in heavy brackets [ ] appears in the original patent but forms no part of this reissue specification; matter printed in italics indicates the additions made by reissue.

This application is a continuation-in-part of PCT/IB00/01571 filed Oct. 31, 2000.

FIELD OF THE INVENTION

This invention relates to a brake mechanism for a conveyor idler, and to a kit of parts for a brake mechanism for a conveyor idler.

BACKGROUND TO THE INVENTION

Typically a conveyor belt arrangement includes a conveyor belt supported on a series of conveyor idlers located along the length of the conveyor belt. Conveyor idlers are also referred to as conveyor rollers and, in this specification, a reference to a conveyor idler includes a reference to a conveyor roller. In the art it is known to drive the conveyor belt via a motor so that the conveyor belt runs on the conveyor idlers which are rotatably connected to a support frame.

The conveyor idlers typically do not include braking means and run freely in both a forward or reverse direction. This can create problems, especially with inclined conveyor belt arrangements. If the conveyor belt snaps, or the motor trips, then the conveyor belt may move in the reverse direction under the load on the conveyor belt. This will result in the load being deposited at the back of the conveyor belt arrangement which creates a safety hazard for employees, can cause damage to surrounding structures and results in production downtime.

Brake mechanisms for conveyor belts are known, but these are usually separate mechanisms which act on the conveyor belt itself and are located adjacent the conveyor belt where they are easily damaged. In addition, because these brake mechanisms are exposed they require regular maintenance. These brake mechanisms are relatively expensive. Furthermore, if the conveyor belt breaks, then these brake mechanisms, known as hold-backs, cannot prevent the conveyor belt and its load from running backwards.

U.S. Pat. No. 1,437,718 describes a cane carrier consisting of a flexible endless conveyor having two parallel spaced endless chains with slats extending between the two endless chains. Two dogs or cams are pivotally located above the slats. The dogs have teeth which permit movement of the upper flight in the upward direction, but prevent downward movement of the upper flight by digging into the slats. The cane carrier also has two sprockets which mesh with the upper and lower flights of the two endless chains. Associated with each sprocket is a ratchet and pawl which permits the sprocket to rotate in one direction only. The sprockets thus allow the upper flights to move upwardly but not downwardly, and prevent the lower flights from moving when the pawls are engaged with their sprockets.

U.S. Pat. No. 4,548,316 describes a conveyor holdback or conveyor run-back stop mechanism. The holdback is interposed between a drive motor and a gearbox. The holdback has a one-way ratchet arrangement which permits a drum around which the conveyor belt is looped to rotate in one direction only. Provided the conveyor belt does not break, the holdback will prevent the conveyor belt from running backwards.

DE 864978 also describes a holdback which is located on a fast turning drive shaft to a gearbox. This holdback also prevents the conveyor belt from running backwards.

It is desirable to have a conveyor idler which incorporates a braking mechanism which is not exposed to the elements, permits rotation of the conveyor idler in a forward direction, and retards rotation of the conveyor idler in a reverse direction thereby providing a braking effect on the conveyor belt.

SUMMARY OF THE INVENTION

According to a first aspect of the invention there is provided a brake mechanism for a substantially hollow conveyor idler which is rotatable about an idler shaft, the brake mechanism comprising:

a brake guide secured to the idler shaft and defining an outer surface adapted to fit rotatably within the hollow conveyor idler, the outer surface including at least one recess thereon; and a brake element located in the recess, between an inner surface of the conveyor idler and the brake guide, and movable in the recess, between a first position and a second position;

wherein the recess is shaped such that in the first position the brake element is received substantially within the recess and in the second position the brake element protrudes from the recess and engages the inner surface of the conveyor idler.

Preferably the at least one recess defines a brake surface along which the brake element is moveable between the first and second positions.

Typically the brake guide is cylindrical and the outer surface of the brake guide is substantially complemental to the inner surface of the conveyor idler. Conveniently the brake guide defines a cylindrical surface and at least one end surface and at least one recess is located on the cylindrical surface. Optionally at least one recess is located on the end surface.

The brake element may be spherical. Alternatively the brake element may be cylindrical.

Ideally the brake guide includes a plurality of recesses located at regular intervals on the outer surface.

According to a second aspect of the invention there is provided a kit of parts for a brake mechanism for a hollow conveyor idler which is rotatable about an idler shaft, the kit comprising:

a brake guide securable to the idler shaft and defining an outer surface adapted to fit rotatably within the hollow conveyor idler, the outer surface including at least one recess thereon; and a brake element locatable in the recess, between an inner surface of the conveyor idler and the brake guide, and movable in the recess, between a first position and a second position;

wherein the recess is shaped such that in the first position the brake element is received substantially within the recess and in the second position the brake element protrudes from the recess to engage the inner surface of the conveyor idler.

The brake element may be a ball bearing. Alternatively the brake element may be an elongate roller bearing.

According to another aspect of the invention a conveyor idler includes a sleeve having an outer surface and inner surface, a shaft about which the sleeve can rotate in a forward direction, a locking mechanism for preventing the sleeve from rotating in a reverse direction, but which locking mechanism permits rotation of the sleeve in the forward direction, the locking mechanism being located within the sleeve and having a shaft member which is fixed to the shaft and a rotatable member which is fixed directly or indirectly to the sleeve so that the rotatable member is rotatable with the sleeve in the forward direction, at least one locking member being interposed between the shaft member and the rotatable member so that the at least one locking member can lock the rotatable member to the shaft member to prevent the sleeve from rotating in the reverse direction but which locking member permits the rotatable member to rotate relative to the shaft member in the forward direction.

In the preferred form of the invention the at least one locking member is movable between an unlocked position in which the sleeve can rotate in the forward direction and a locked position in which it prevents the sleeve from rotating in the reverse direction.

The shaft member is preferably located within the rotatable member. However, the shaft member may be axially spaced from the rotatable member, with the rotatable member being fixed to an end cap which is in turn fixed to the sleeve so that the end cap is rotatable with the sleeve.

In one form of the invention a plurality of locking members may be provided.

The shaft member preferably has two side faces and an outer surface with a plurality of circumferentially spaced ramps on the outer surface, with locking members located on at least some, and preferably on all, of the ramps, and wherein the rotatable member defines a race with the locking members being sandwiched between the race and the ramps of the shaft member, and wherein the locking members are movable along their ramps between locked and unlocked positions.

The shaft member preferably has at least six ramps. In one form of the invention eight ramps are provided. In the preferred form of the invention ten ramps are provided.

The shaft member is preferably fixed to the shaft by being keyed to a keyway in the shaft with a key.

The shaft member is preferably made of a harder material than the rotatable member. The shaft member may be at least 50% harder than the rotatable member. Preferably the shaft member is at least 75% harder than the rotatable member. In one form of the invention the shaft member is 96% harder than the rotatable member. The rotatable member may be made of mild steel (EN8) which has a Rockwell hardness of 28, and the shaft member may be hardened to 55 Rockwell.

The locking members may be ball bearings or roller bearings. The locking members are preferably harder than the shaft member and harder than the rotatable member. In one form of the invention the locking members have a hardness of 60 Rockwell.

The rotatable member preferably has an outer surface with a diameter slightly less than the diameter of the inner surface of the sleeve. The rotatable member preferably also has two opposed side faces between which the shaft member and the locking members are sandwiched. A spacer may be interposed between each side face on the one hand, and the shaft member and the locking members on the other hand. Each spacer is preferably annular with an inner raised portion which abuts the shaft member. The spacers are preferably made of a polymeric material. In one form of the invention they are made of nylon.

The race of the rotatable member preferably includes a groove for the locking members to increase the contact area between the locking members and the rotatable member.

The rotatable member is preferably fixed to the sleeve by being welded to the inner surface of the sleeve by a weld or welds.

BRIEF DESCRIPTION OF THE DRAWINGS

The invention will now be described in more detail, by way of example only, with reference to the accompanying drawings in which.

Embodiments of the invention are described in detail in the following passages of the specification which refer to the accompanying drawings. The drawings, however, are merely illustrative of how the invention might be put into effect, so that the specific form and arrangement of the features shown is not to be understood as limiting on the invention.

DESCRIPTION OF THE EMBODIMENTS

Figure 1:
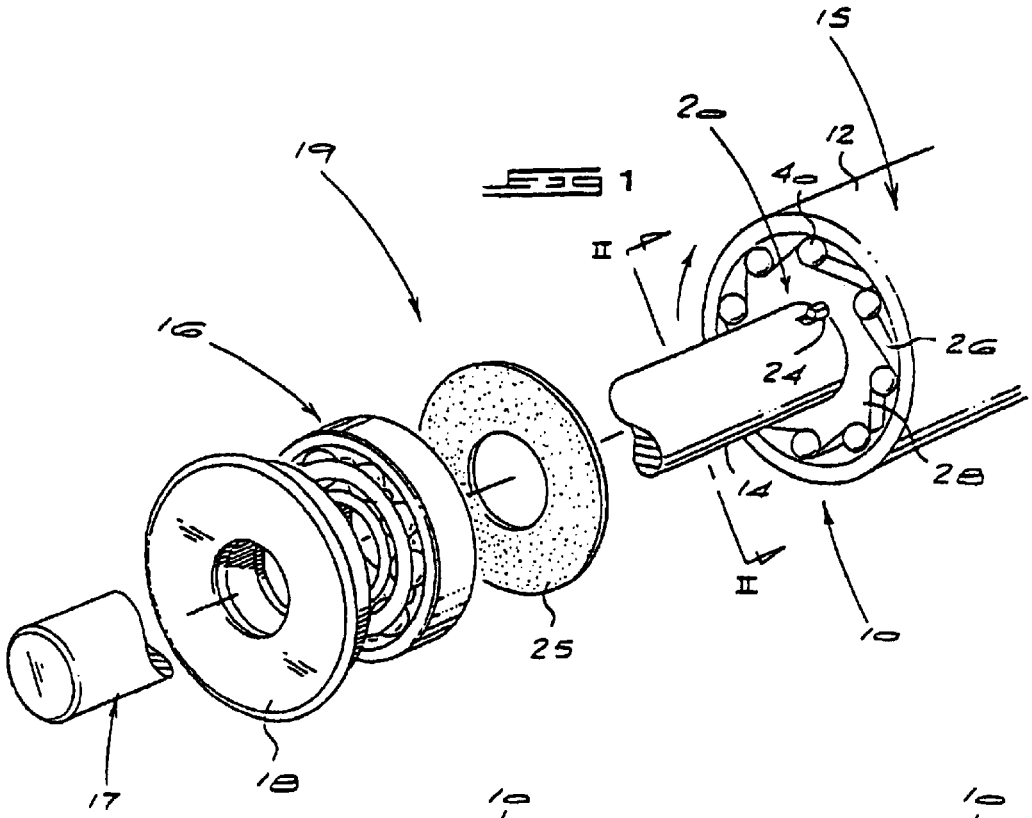
FIG. 1 shows an exploded perspective view of a conveyor idler with a braking mechanism according to a first embodiment of the invention.

FIG. 1 shows a brake mechanism 10 for a hollow conveyor idler 12. Conveyor idlers of this nature are known in the art. The conveyor idler is cylindrical and is typically formed from metal, but could be formed from any suitable material including a thermoplastics material. In the embodiment shown in FIG. 1, the conveyor idler has an outer diameter of approximately 65 mm and an inner diameter of approximately 60 mm. It should be understood that the diameter of the conveyor idler varies depending on the specific application.

The conveyor idler is rotatably connected to an idler shaft 14 which is co-axial with the conveyor idler. The idler shaft is formed from steel and in the embodiment shown in FIG. 1 has a diameter of 25 mm. The diameter of the idler shaft can be varied depending on the specific application. The ends of the idler shaft are fixed to a frame *17* of a conveyor belt arrangement [(not shown)] *15*. The conveyor idler is rotatably connected to the idler shaft by means of bearing assemblies 16 which engage an inner surface of the conveyor idler and run on the idler shaft. The bearing assemblies are retained in position by end caps 18 which fit over the idler shaft and into either end of the conveyor idler in a press fit configuration. The end caps are made from a thermoplastics material and include a seal arrangement (not shown) which prevents the ingress of dirt into the conveyor idler and the bearing arrangements. A conveyor belt [(not shown)] *15* runs on the outside surface of the conveyor idler.

Figure 2:
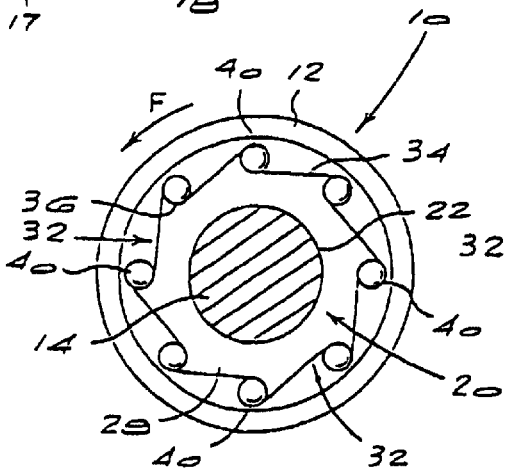
FIG. 2 shows a cross sectional end view of the brake mechanism taken along line II—II in FIG. 1, with the idler rotating in a forward direction.

As can be seen more clearly in FIG. 2, the brake mechanism 10 comprises a brake guide in the form of a plate 20. The plate is metal and is substantially circular in cross section with a bore 22 located centrally therein. The bore has the same diameter as the idler shaft, approximately 25 mm, which allows the plate to be located on the idler shaft. The plate is connected to the idler shaft by means of a keyway 24 in the idler shaft. The keyway is approximately 8 mm long and 4 mm deep and a complemental key is located in the keyway in order to secure the plate to the idler shaft. It should be understood that the plate could be connected to the idler shaft by other means, including welding, a retaining screw, bolts or rivets. The plate could also be formed from another material such as Vascanite™. Depending on the application, there could be multiple plates located along the length of the idler shaft. However, typically one plate is sufficient to provide sufficient braking action for general use. In a preferred embodiment, the plate is located between bearing assemblies within the conveyor idler. Brushes 25 are located against the end surfaces of the plate and the bearing assemblies to reduce wear and friction.

The plate has an effective outer diameter of approximately 59 mm so that it can be inserted into the conveyor idler without restricting the rotation of the conveyor idler. In this arrangement, the plate is secured to the idler shaft and the conveyor idler rotates around the idler shaft and plate. The plate is approximately 5 mm thick. As will be described in more detail below, the thickness of the plate can be varied depending on the amount of braking force desired. The plate defines a cylindrical outer surface 26, a first end surface 28 and a second end surface 30.

Eight recesses 32 are located on the cylindrical outer surface and are spaced evenly around the circumference of the plate. It should be understood that the plate could include more or less recesses, depending on the amount of braking action desired. However, it has been found that eight recesses provides sufficient braking action for general use. Each recess extends across the width of the plate, between the first and second end surfaces. It should be understood that each recess could extend along only a portion of the width of the plate, i.e. not from the first end surface to the second end surface. Each recess is shaped, in cross section, to define a step with a front end 34 and a back end 36. The depth of each step, with respect to the cylindrical outer surface, is tapered so that it increases from the front end to the back end. The front end of the step is substantially flush with the outer diameter of the plate whereas the back end of the step is approximately 5 mm below the outer diameter of the plate.

Figure 3:
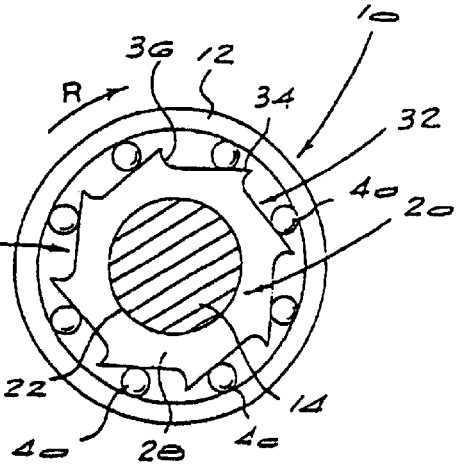
FIG. 3 shows a cross sectional end view of the brake mechanism taken along line II—II in FIG. 1, with the idler stopped from rotating in a reverse direction.

The brake mechanism includes further a brake element in the form of a ball bearing 40. A ball bearing is located in each recess, between the conveyor idler 12 and the plate 20. It should be understood that instead of a ball bearing, the brake element could be in the form of a cylindrical roller bearing extending across the width of the recess. When compared with the ball bearings, the roller bearings provide a larger surface area in contact with the inner surface of the conveyor idler and thus create a greater braking action. However, it has been found that the ball bearings provide sufficient braking action for general use. Each ball bearing is movable along the recess, between a first position at the back end 36 of the recess, as shown in FIG. 2, and a second position at the front end 34 of the recess, as shown in FIG. 3. The ball bearings are retained in place in the recesses by the brushes 25 which are located against both end surfaces of the plate in order to reduce wear and friction with the bearing assemblies, as described above. The diameter of the ball bearing is selected so that when the ball bearing is in the first position, the ball bearing is received substantially within the recess, i.e. the diameter of the ball bearing is substantially equal to the depth of the step at the back end. As the ball bearing moves from the first position towards the second position, it begins to protrude from the recess and engage the inner surface of the conveyor idler.

FIG. 2 shows the conveyor idler rotating in a forward direction, indicated by arrow F. With the conveyor idler rotating in the forward direction, the inner surface of the conveyor idler draws the ball bearings 40, under the influence of friction, towards the back end 36 of the recess 32 and thus the ball bearings are received substantially within the recesses. As a result, there is no braking force applied to the conveyor idler. FIG. 3 shows the conveyor idler which has been prevented from rotating in a reverse direction, indicated by the arrow R, by the brake mechanism. With the conveyor idler rotating in the reverse direction, the inner surface of the conveyor idler draws the ball bearings 40, under the influence of friction, towards the front end 34 of the recess 32. As the ball bearings move towards the front end of the recesses they begin to protrude from the recesses and create a braking action on the inner surface of the conveyor idler.

Figure 4:
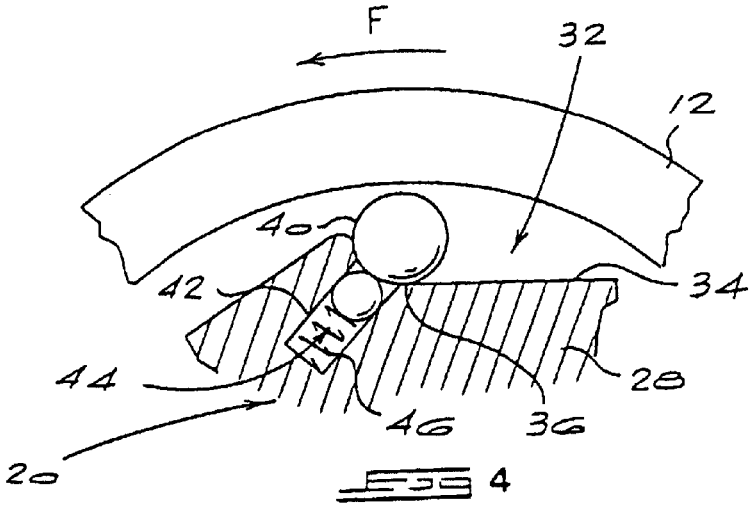
FIG. 4 shows a close-up cross sectional end view of a portion of a brake guide of the brake mechanism shown in FIG. 2.

FIG. 4 shows a close-up view of a portion of the plate 20 with an optional feature. As can be seen, at the back end 36 of each recess there is located a shaft 42 which houses a spring mechanism 44. The spring mechanism includes a spring 46 located in the shaft and biased towards the recess. As indicated above, when the conveyor idler is rotating in a forward direction, the ball bearing 40 is drawn under the influence of friction towards the back end 36 of the recess 32. This has the effect of compressing the spring 46 as shown in FIG. 4. When the conveyor idler rotates in the reverse direction (not shown), the ball bearing is drawn under the influence of friction towards the front end 34 of the recess. With the compression force removed, compressed spring 46 pushes the ball bearing towards the front end thus ensuring that the ball bearing does not get stuck in the back end of the recess.

Figure 5:
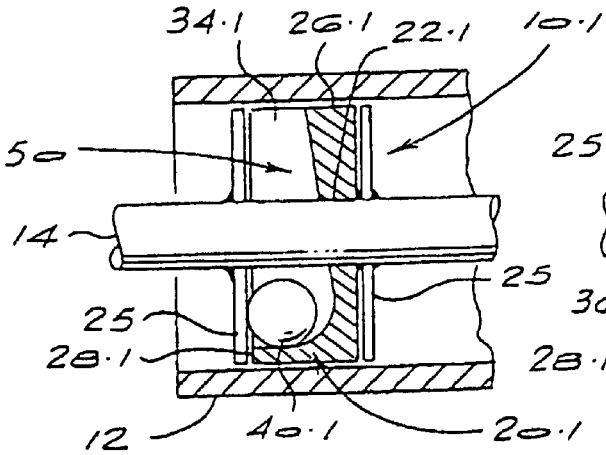
FIG. 5 shows a cross sectional side view of a brake mechanism according a second embodiment, with the idler rotating in a forward direction.
Figure 6:
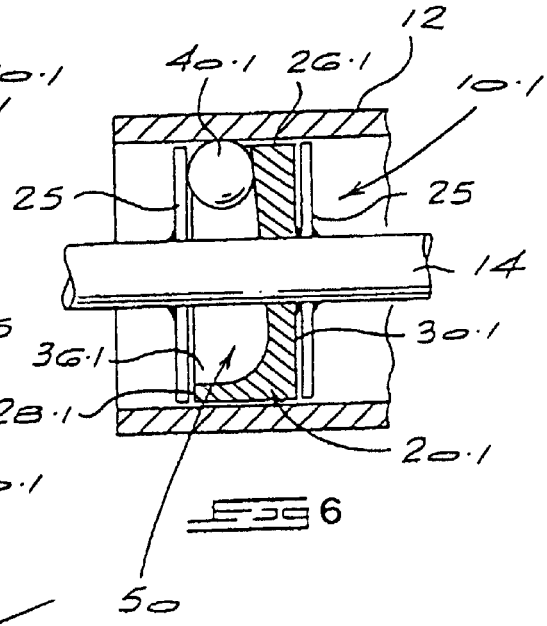
FIG. 6 shows a cross sectional side view of the brake mechanism according to the embodiment in FIG. 5, with the idler stopped from rotating in a reverse direction.
Figure 7:
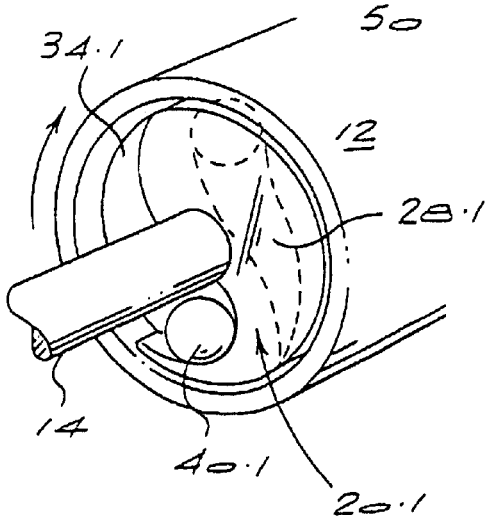
FIG. 7 shows a partially exploded perspective view of the brake guide of the brake mechanism according to the embodiment in FIG. 5.
Figure 8:
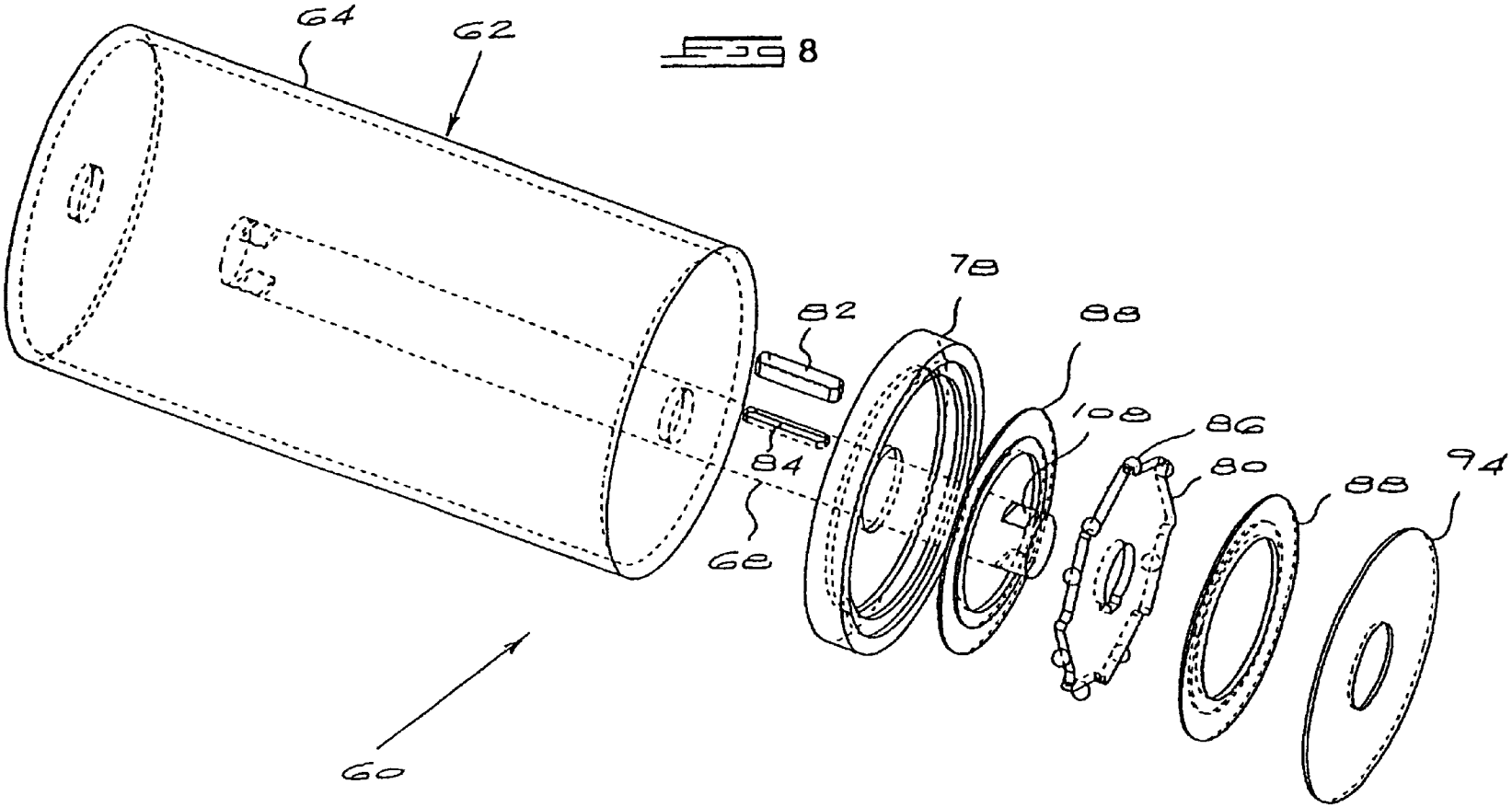
FIG. 8 is an exploded perspective view of a conveyor idler according to another embodiment of the invention.
Figure 9:
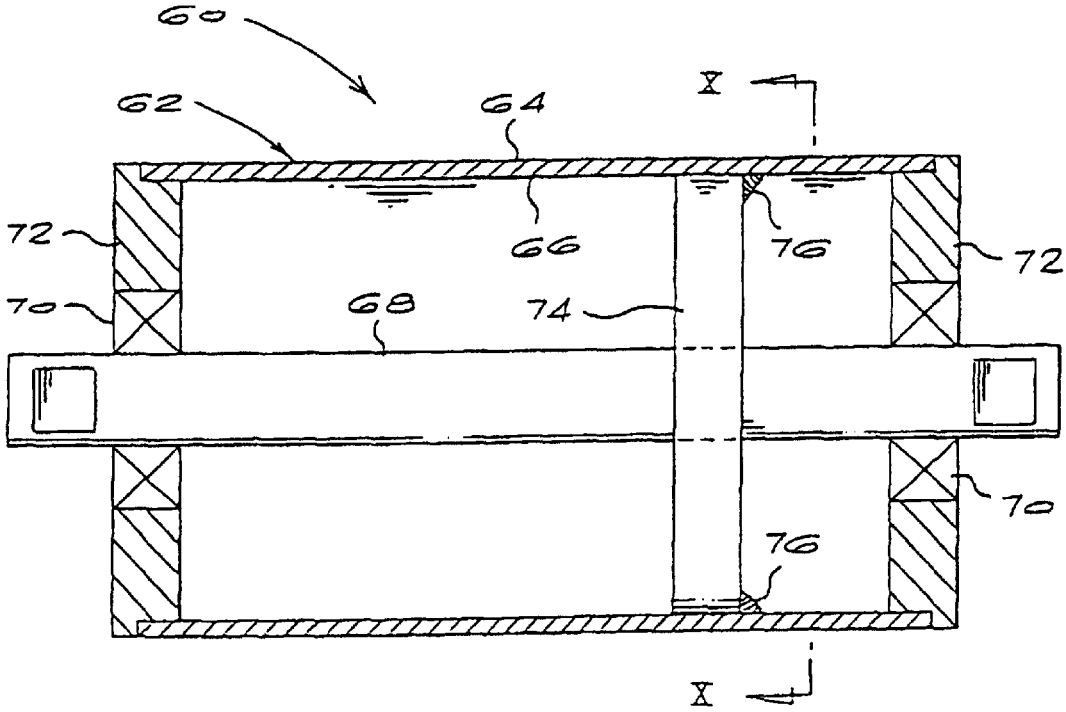
FIG. 9 is an assembled cross-sectional view of the conveyor idler of FIG. 8 including end caps and bearings.
Figure 10:
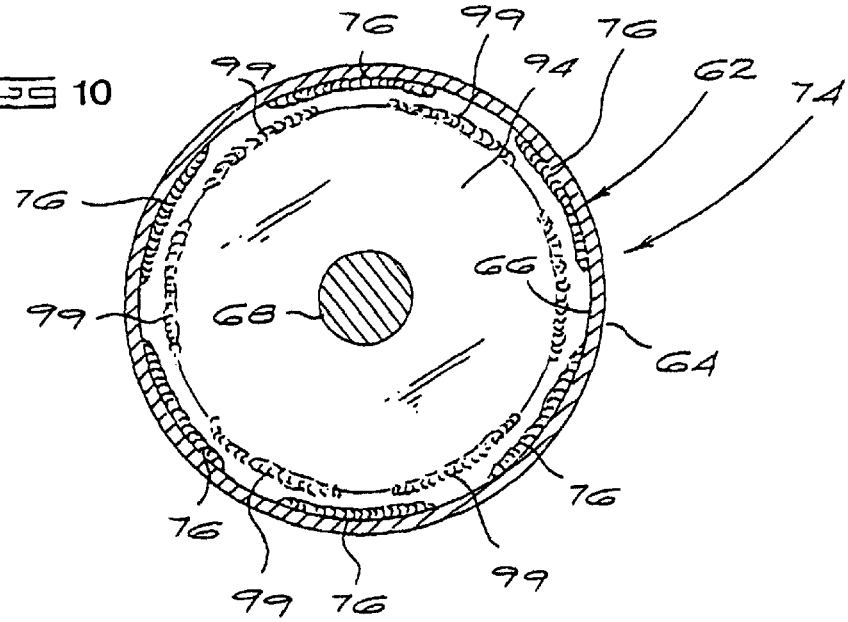
FIG. 10 is a cross-sectional end view on line X—X of FIG. 9.
Figure 11:
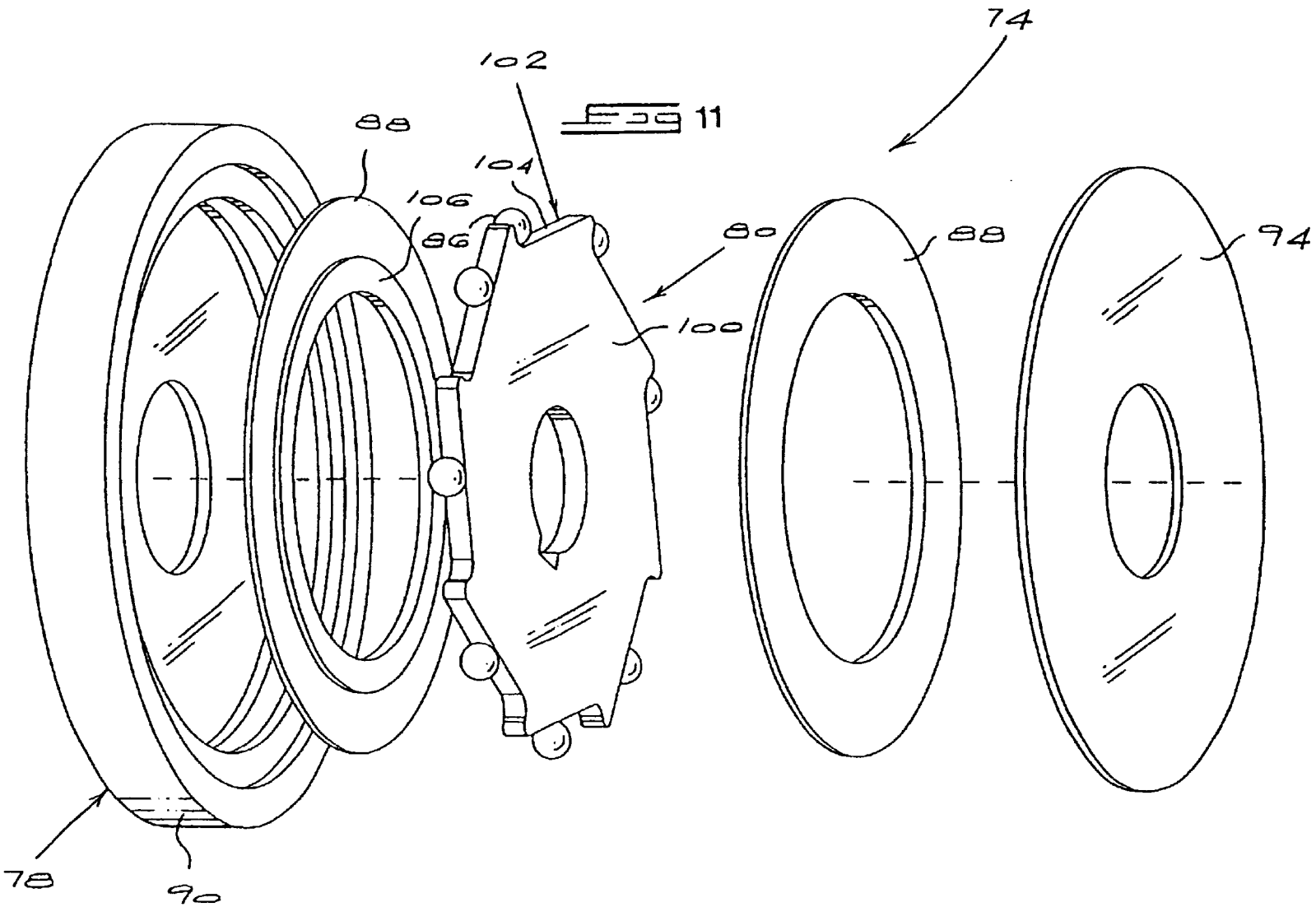
FIG. 11 is an exploded perspective view of the locking mechanism of the conveyor idler of FIGS. 8 to 10.
Figure 13:
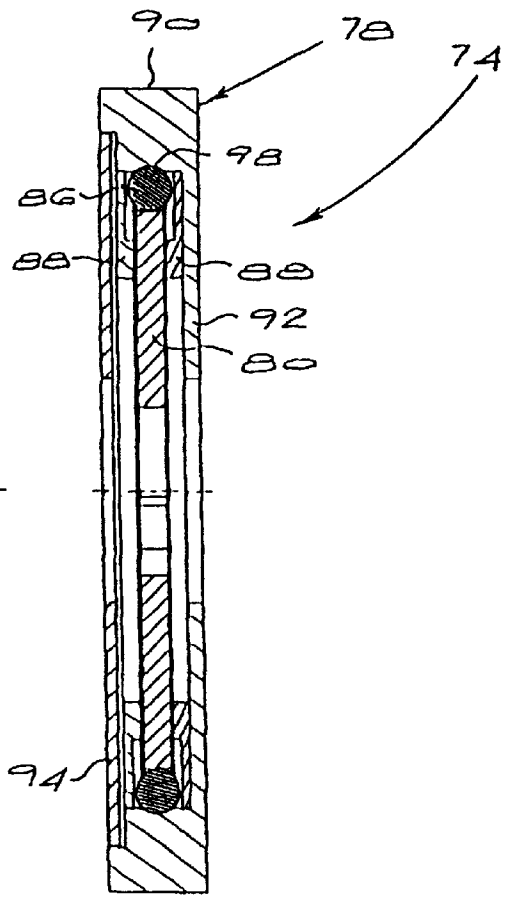
FIG. 13 is a partly sectioned cross-sectional side view on line XIII—XIII of FIG. 12.
Figure 12:
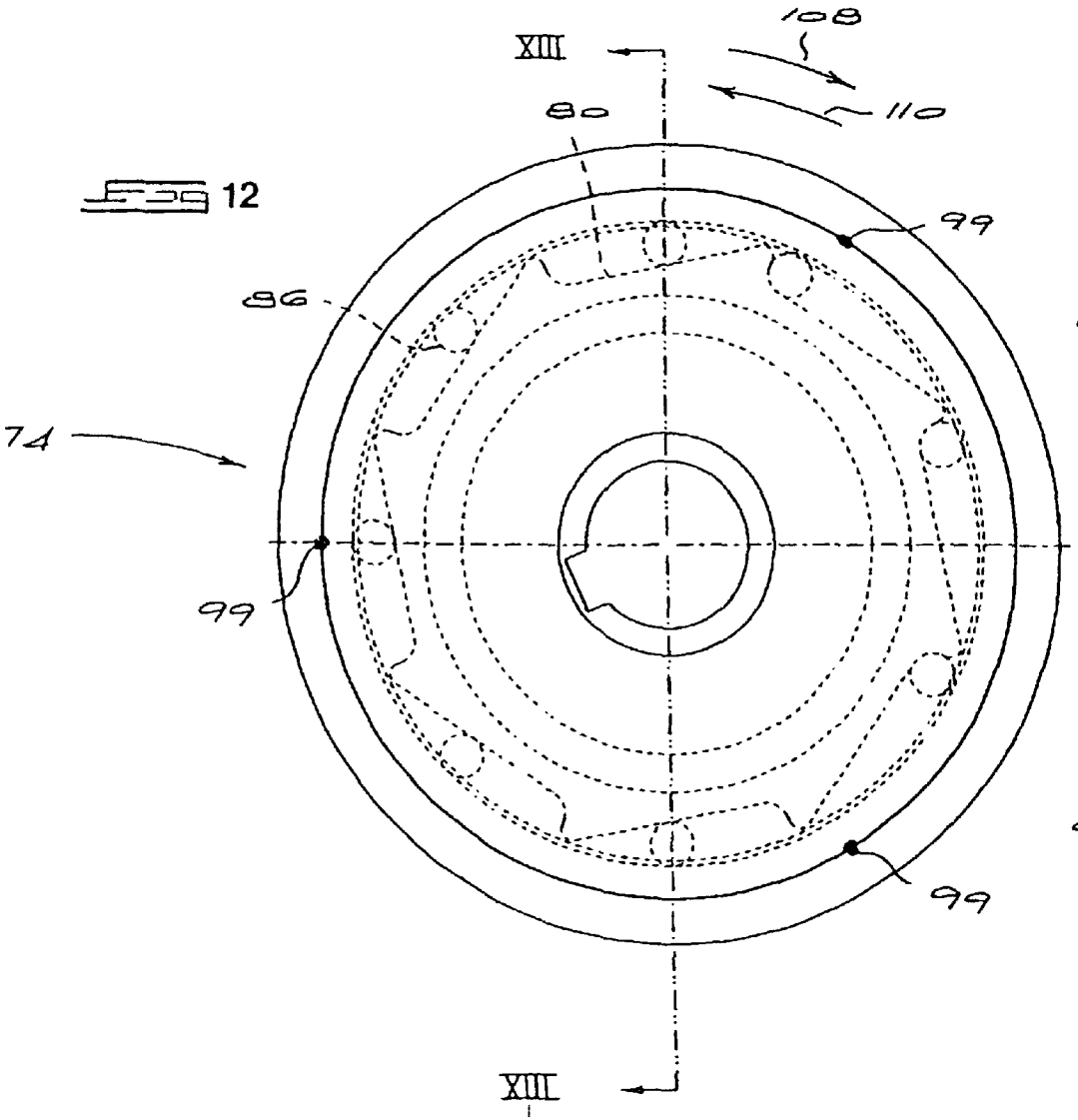
FIG. 12 is an assembled plan view of the locking mechanism.
Figures 14, 15:
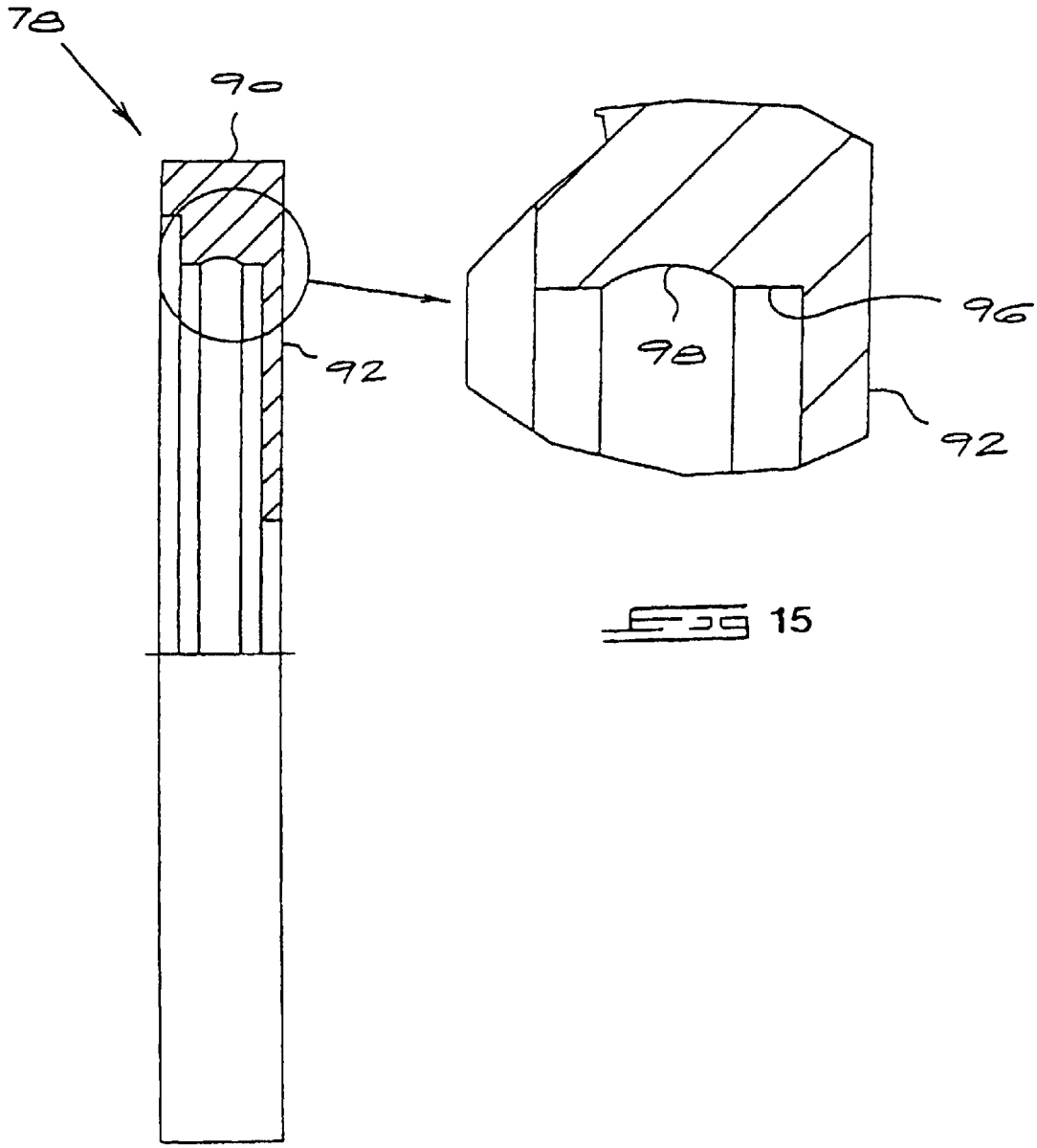
FIG. 14 is a partly sectioned cross-sectional side view of a rotatable member or sleeve member of the locking mechanism.
FIG. 15 is an enlarged view of the circled portion of FIG. 14.
Figure 16:
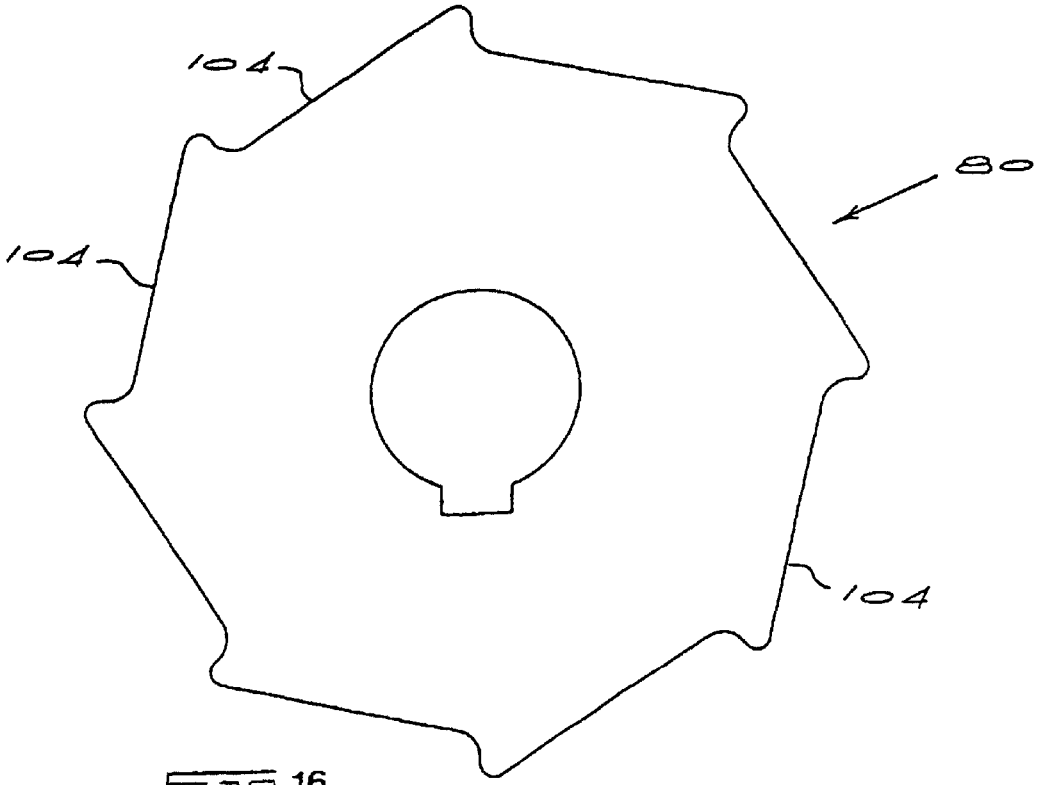
FIG. 16 is a plan view of the shaft member of the locking mechanism.

FIGS. 5 to 7 show another embodiment of the braking mechanism according to the invention. The braking mechanism 10.1 is once again adapted for use with a hollow conveyor idler 12. The conveyor idler is rotatably connected to an idler shaft 14 which is co-axial with the conveyor idler. As with the embodiments shown in FIGS. 1 to 4, the conveyor idler is rotatably connected to the idler shaft by means of bearing assemblies (not shown) which again engage an inner surface of the conveyor idler and run on the idler shaft. The bearing assemblies are retained in position by end caps (not shown) which fit over the idler shaft and into either end of the conveyor idler in a press fit configuration. A conveyor belt [(not shown)] *15* runs on the outside surface of the conveyor idler.

As can be seen more clearly in FIG. 5, the brake mechanism 10 comprises a brake guide in the form of a plate 20.1. The plate is metal and is substantially circular in cross section with a bore 22.1 located centrally therein. The bore has the same diameter as the idler shaft which allows the plate to be located on the idler shaft. The plate is again connected to the idler shaft by means of a keyway (not shown) in the idler shaft. The keyway is approximately 8 mm long and 4 mm deep and a complemental key is located in the keyway in order to secure the plate to the idler shaft. It should be understood that the plate could be connected to the idler shaft by other means, including welding, a retaining screw, bolts or rivets. The plate 20.1 could also be formed from another material such as Vascanite™. The plate is located between bearing assemblies within the conveyor idler. Brushes 25 are located against the end surfaces of the plate and the bearing assemblies to reduce wear and friction.

The plate has an effective outer diameter such that it can be inserted into the conveyor idler without restricting the rotation of the conveyor idler. In this arrangement, the plate is secured to the idler shaft and the conveyor idler rotates around the idler shaft and plate. The plate is approximately 15 mm thick. As will be described in more detail below, the thickness of the plate can be varied depending on the amount of braking force desired. The plate defines a cylindrical outer surface 26.1, a first end surface 28.1 and a second end surface 30.1.

A recess 50 is located on each of the end surfaces 28.1 and 30.1. In FIG. 7 the recess on the second end surface 30.1 is shown in broken lines. These recesses extend to the circumference of the plate thereby also forming recesses in the cylindrical outer surface of the plate. It should be understood that the plate could include more or less recesses, depending on the amount of braking action desired. Each recess is shaped, in cross section, to define a step with a front end 34.1 located on the circumference of the plate, and a back end 36.1. The depth of each step, with respect to the end surface on which it is located, is tapered so that it increases from the front end to the back end.

The brake mechanism includes further a brake element in the form of a ball bearing 40.1. A ball bearing is located in each recess, between the conveyor idler 12, the plate 20.1 and the associated brush. Each ball bearing is movable along the recess, between a first position at the back end 36.1 of the recess, as shown in FIG. 5, and a second position at the front end 34.1 of the recess, as shown in FIG. 6. The diameter of the ball bearing is selected so that when the ball bearing is in the first position, the ball bearing is received substantially within the recess, i.e. the diameter of the ball bearing is substantially equal to the depth of the step at the back end. As the ball bearing moves from the first position towards the second position, it begins to protrude from the recess and engage the inner surface of the conveyor idler and the brush 25.

FIGS. 5 and 7 show the conveyor idler rotating in a forward direction, indicated by arrow F. With the conveyor idler rotating in the forward direction, the movement of the brush draws the ball bearings 40.1, under the influence of friction, towards the back end 36.1 of the recess 32.1 and thus the ball bearings are received substantially within the recesses. As a result, there is no braking force applied to the conveyor idler. FIG. 6 shows the conveyor idler which has been prevented from rotating in a reverse direction, by the brake mechanism. With the conveyor idler rotating in the reverse direction, the brush draws the ball bearings 40.1, under the influence of friction, towards the front end 34.1 of the recess 32.1. As the ball bearings move towards the front end of the recesses they begin to protrude from the recesses and create a braking action on the inner surface of the conveyor idler and on the brush.

According to a second aspect of the invention there is provided a kit of parts for a brake mechanism for a conveyor idler which is rotatable about an idler shaft, the kit comprising a plate connectable to the idler shaft and including eight recess on a surface of the brake guide. The kit includes eight ball bearings locatable in the recess, between the idler and the brake guide, and movable along the recess, between a first position and a second position, wherein the recess is shaped such that in the first position the brake element is received substantially within the recess and in the second position the brake element protrudes from the recess.

Referring now to FIGS. 8 to 16, a conveyor idler 60 includes a drum or sleeve 62. The sleeve 62 has an outer surface 64 which is in use in contact with a conveyor belt (not shown), and an inner surface 66. The sleeve 62 is rotatable in forward direction about a shaft 68 via bearings 70 supported in end caps 72.

A locking mechanism 74 is located within the sleeve 62. The locking mechanism 74 prevents the sleeve 62 from rotating in the reverse direction. The locking mechanism 74 has a sleeve member or rotatable member 78, which is welded by welds 76 to the inner surface 66 of the sleeve 62 (see FIG. 10). A shaft member 80 is located within the rotatable member 78. The shaft member 80 is keyed to the shaft 68 via a key 82 and keyway 84. Ball bearings 86 are sandwiched between the shaft member 80 and the rotatable member 78. The shaft member 80 is sandwiched between two nylon spacers 88.

The rotatable member 78 has an outer surface 90, a first side face 92, a second side face formed by a closure member 94, and an inner surface 96. A race or groove 98 for the ball bearings 86 is provided on the inner surface 96 of the rotatable member. The closure member 94 is welded to the remainder of the rotatable member 78 by welds 99.

The shaft member 80 has two side faces 100 and an outer surface 102 with eight circumferentially spaced ramps 104 on which the ball bearings 86 are located. The ball bearings 86 are lubricated with grease. The rotatable member is made of EN8 mild steel. The shaft member is made of armourplate RB 390 steel.

Each spacer 88 has a raised section 106 which abuts the rotatable member 80.

The shaft 68 has two flat sections 108 at either of its ends. The ends of the shaft 68 are mounted in a stringer or idler frame [(not shown)] *17* via the flat sections 108 in a non-rotatable fashion. A conveyor belt [(also not shown)] *15* is support on the outer surface 64 of the sleeve 62. The sleeve 62 can rotate in a forward direction which is indicated by arrow 108 in FIG. 12.

The forward direction is the direction of rotation which tends to cause the ball bearings 86 to move down their ramps 80. The reverse direction is indicated by arrow 110 in FIG. 12. Attempted rotation in the reverse direction tends to cause the ball bearings to move up their ramps 80. Reverse rotation will cause some of the ball bearings 86 to jam between the rotatable member 78 and the shaft member 80 thereby locking the rotatable member 78 to the shaft member 80. Because the shaft member 80 is keyed to the shaft 68, which cannot rotate, and because the rotatable member 78 is welded to the sleeve 62, the sleeve 62 cannot rotate when the rotatable member 78 is locked to the shaft member 80 by some of the ball bearings 86.

The conveyor belt and its load are supported on numerous conveyor idlers 60 along the length of the conveyor belt. Each conveyor idler 60 can withstand a certain amount of torque (holdback torque) in the reverse direction, and thus the conveyor belt and its load are prevented from running backwards. In practice, the applicant has found that if about one out of every three conventional conveyor idlers is replaced with a conveyor idler according to the invention, sufficient holdback torque is provided to prevent a conveyor belt from running backwards. More than one locking mechanism 74 may be provided within a conveyor idler to increase its holdback torque.

Figure 17:
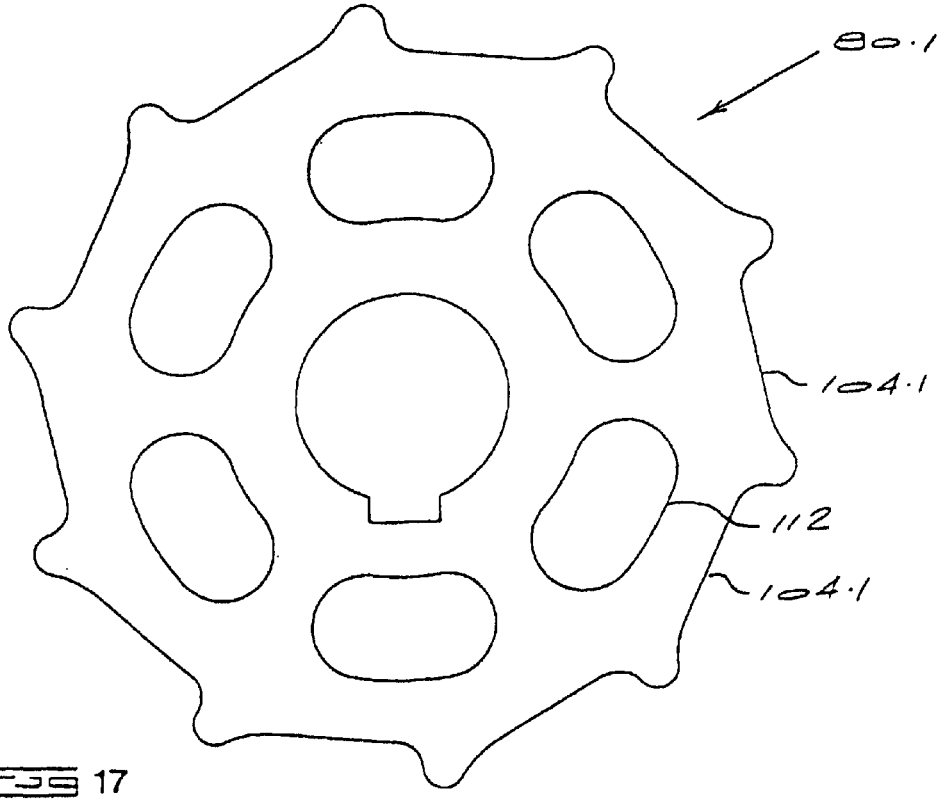
FIG. 17 is a plan view of a ten ramp shaft member of the locking mechanism.

Referring now to FIG. 17, increasing the number of ramps 104.1 from eight to ten on the shaft member 80. 1, increases the holdback torque of the conveyor idler. The shaft member 80.1 has cut-outs 112 to reduce its mass.

Figure 18:
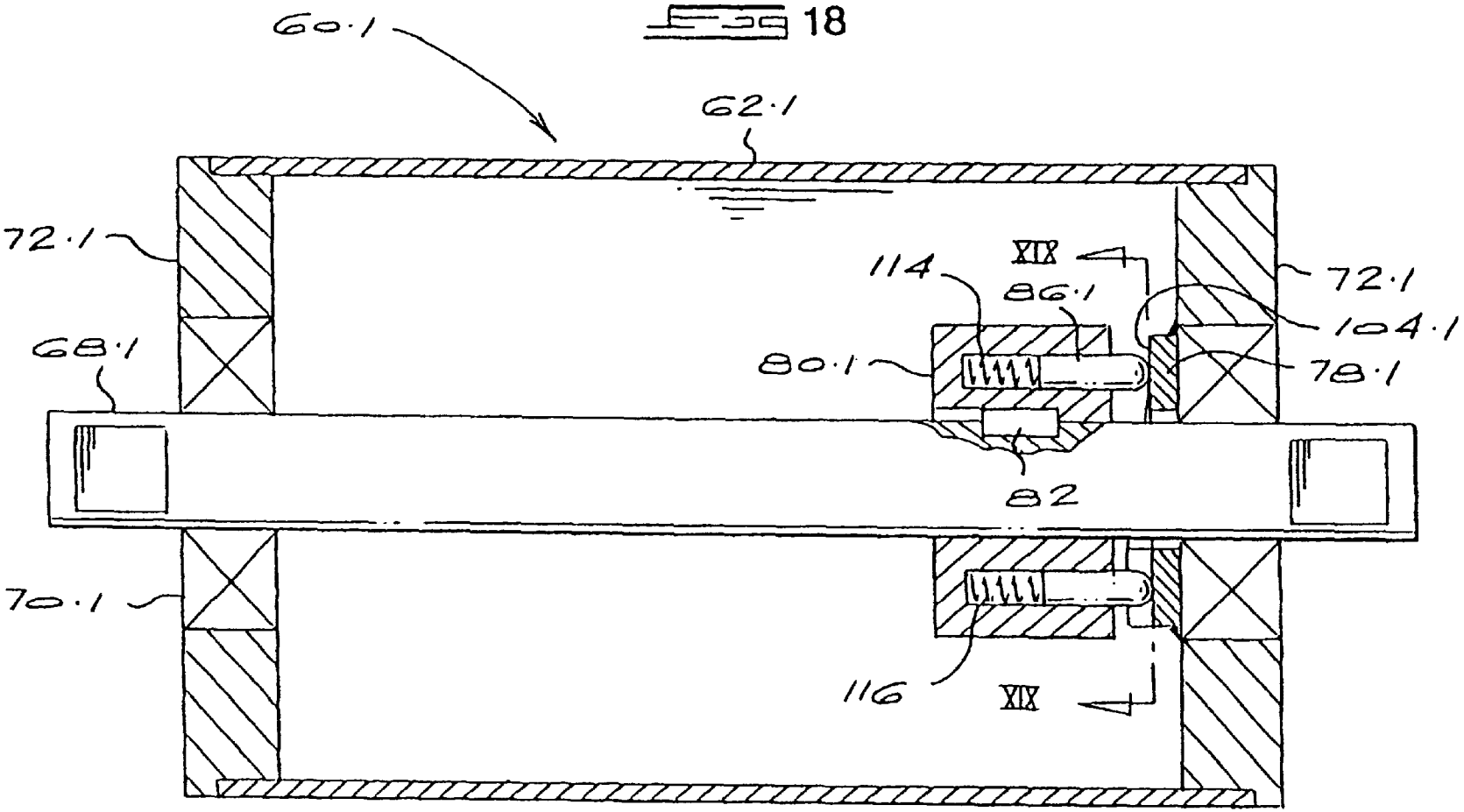
FIG. 18 is a cross-sectional side view of a conveyor idler according to another embodiment of the invention.
Figure 19:
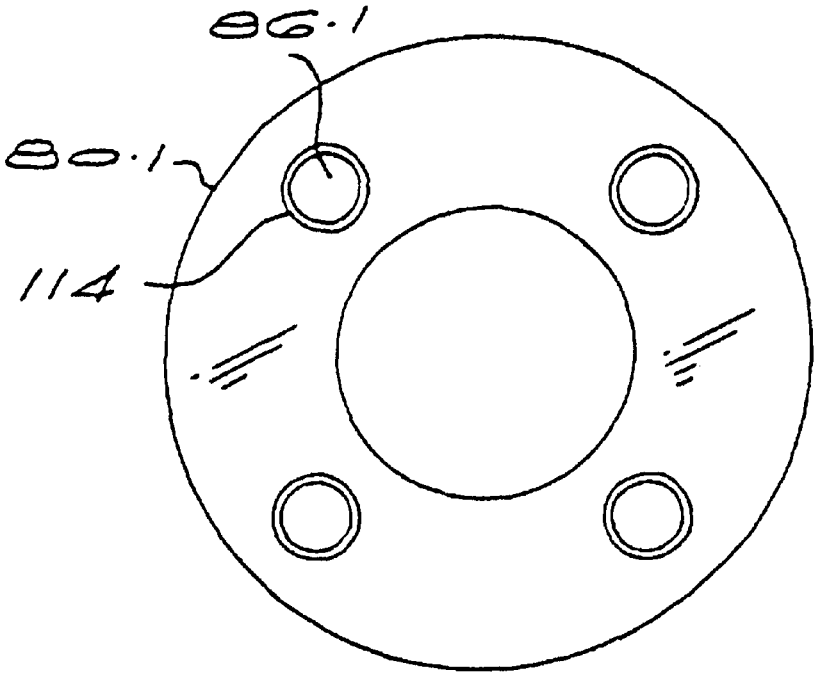
FIG. 19 is an end view on line XIX—XIX of FIG. 18.
Figure 20:
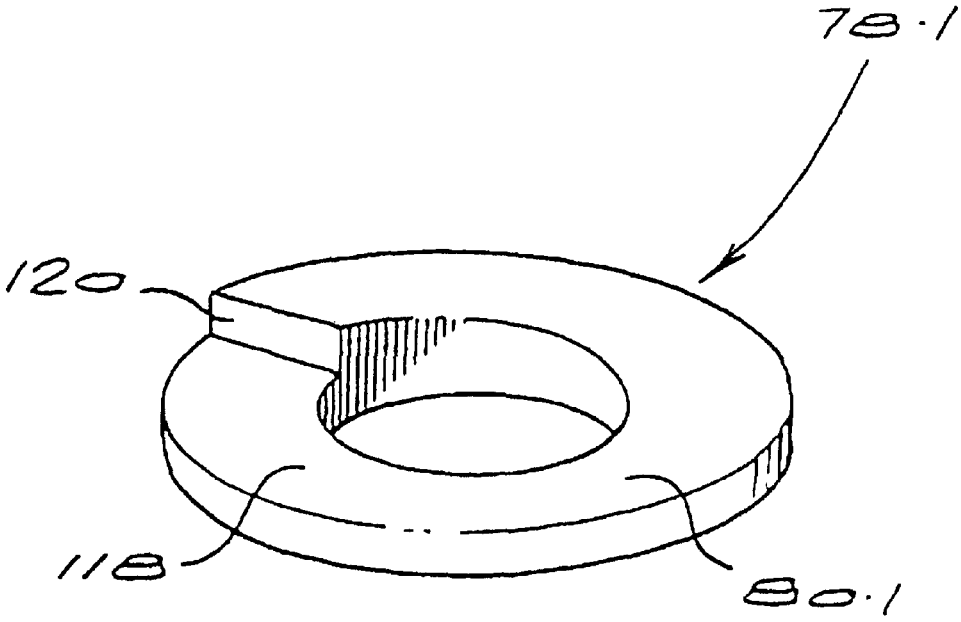
FIG. 20 is a perspective view of the rotatable member of the locking mechanism of FIG. 18.

Referring now to FIGS. 18 to 20, a conveyor idler 60.1 has a sleeve 62.1 rotatably supported on a shaft 68.1 supported by bearings 70.1 located in end caps 72.1. A cylindrical shaft member 80.1 is fixed to the shaft 68.1 by a key 82. A rotatable member 78.1 is fixed to one of the end caps 72.1 which is in turn fixed to the sleeve 62.1.

Locking members in the form of pins 86.1 are reciprocally mounted in holes 114 in the shaft member 80.1. The pins 86.1 are biased into abutting relationship with the rotatable member 78.1 by springs 116. The rotatable member has a pin bearing surface 118 in the form of a ramp 80.1 with a step 120 (see FIG. 20).

In use, when the sleeve 62.1 rotates in a forward direction, relatively speaking, the pins 86.1 ride up the ramp 80.1 and down the step 120. If the sleeve 62.1 is rotated in a reverse direction, relatively speaking, the pins 86.1 will move down the ramp 80.1 until one of the pins 86.1 abuts the step 120 and locks the rotatable member 78.1 to the shaft member 80.1 thereby prevent any further rotation of the sleeve 62.1 in the reverse direction. Only one pin 86.1 may be used or more than two pins 86.1 may be used. For example, four pins 86.1 may be used and be located at 900 intervals in the shaft member 80.1.

It will be appreciated that many modifications or variations of the invention are possible without departing from the spirit or scope of the invention.

What is claimed is:

1. [A] *An arrangement comprising:*

*a conveyor belt, and*

*a* conveyor idler including*:* a sleeve having an outer surface and an inner surface, *the conveyor belt being supported on and arranged to run on the outer surface of the sleeve,* a shaft about which the sleeve can rotate in a forward direction, a locking mechanism for preventing the sleeve from rotating in a reverse direction, but which locking mechanism permits rotation of the sleeve in the forward direction, the locking mechanism being located within the sleeve and having a shaft member fixed to the shaft, with at least one locking member which can move between an unlocked position in which the sleeve can rotate in the forward direction and a locked position in which the locking member locks the sleeve to the shaft member to prevent rotation of the sleeve in the reverse direction *thereby causing the outer surface of the sleeve to provide a braking effect on the conveyor belt.*

2. The [conveyor idler] *arrangement* of claim 1 wherein the shaft member includes an outer surface with a plurality of circumferentially spaced ramps thereon and wherein the at least one locking member can move along one of the ramps between the unlocked position and the locked position.

3. The [conveyor idler] *arrangement* of claim 2 wherein the at least one locking member is a ball bearing or a roller bearing.

4. The [conveyor idler] *arrangement* of claim 1 wherein the locking mechanism includes a rotatable member fixed directly or indirectly to the sleeve, so that the rotatable member is rotatable with the sleeve in the forward direction.

5. The [conveyor idler] *arrangement* of claim 4 wherein the at least one locking member is interposed between the shaft member and the rotatable member so that the at least one locking member can indirectly lock the sleeve to the shaft member via the rotatable member.

6. The [conveyor idler] *arrangement* of claim 5 wherein the shaft member has two side faces and an outer surface with a plurality of circumferentially spaced ramps on the outer surface, with locking members located on at least some, and preferably on all, of the ramps, and wherein the rotatable member defines a race with the locking members being sandwiched between the race and the ramps of the shaft member, and wherein the locking members are movable along their ramps between locked and unlocked positions.

7. The [conveyor idler] *arrangement* of claim 6 wherein the rotatable member has two opposed side faces between which the shaft member and the locking members are sandwiched.

8. The [conveyor idler] *arrangement* of claim 7 wherein a spacer is interposed between each side face on the one hand, and the shaft member and the locking members on the other hand.

9. The [conveyor idler] *arrangement* of claim 6 wherein the race of the rotatable member includes a groove for the locking members.

10. The [conveyor idler] *arrangement* of claim 4 wherein the rotatable member is directly fixed to the sleeve by being welded to the inner surface of the sleeve by a weld or welds.

11. The [conveyor idler] *arrangement* of claim 4 wherein the shaft member is made of a harder material than the rotatable member.

12. [A] *An arrangement comprising:*

*a conveyor belt, and*

*a* conveyor idler [having] *including:* an outer surface and an inner surface, *the conveyor belt being supported on and arranged to run on the outer surface of the conveyor idler,* a shaft about which the conveyor idler can rotate in a forward direction, a braking mechanism for preventing the conveyor idler from rotating in a reverse direction, but which braking mechanism permits rotation of the conveyor idler in the forward direction, the braking mechanism being located within the conveyor idler and includes at least one brake element which can move between a first position in which the conveyor idler can rotate in the forward direction, and a second position in which the brake element prevents the conveyor idler from rotating in the reverse direction *thereby causing the outer surface of the conveyor idler to provide a braking effect on the conveyor belt*.

13. The [conveyor idler] *arrangement* of claim 12 wherein the braking mechanism includes a brake guide for the at least one brake element.

14. The [conveyor idler] *arrangement* of claim 13 wherein the brake guide is secured to the shaft.

15. The [conveyor idler] *arrangement* of claim 13 wherein the brake guide has an outer surface with a plurality of recesses each having a brake surface and wherein the at least one brake element is located on one of the brake surfaces and wherein the at least one brake element is moveable on its brake surface between the first position and the second position.

16. The [conveyor idler] *arrangement* of claim 15 wherein a plurality of brake elements are provided, with each brake element being located on its respective brake surface.

17. The [conveyor idler] *arrangement* of claim 12 wherein the at least one brake element is a ball bearing or a roller bearing.

18. The [conveyor idler] *arrangement* of claim 13 wherein the at least one brake element is interposed between the brake guide and the conveyor idler.

* * * * *